Patented June 3, 1952

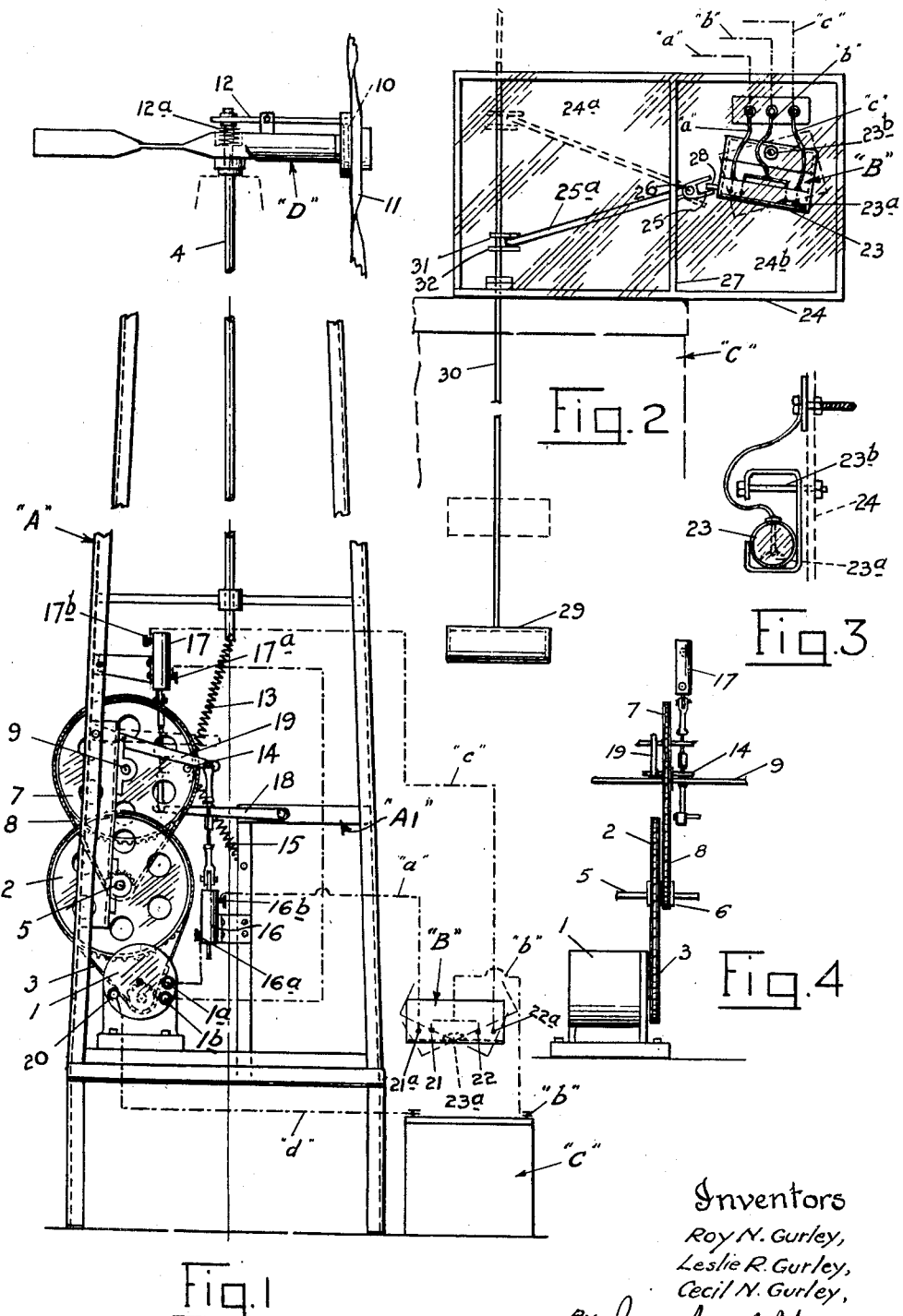

2,598,662

UNITED STATES PATENT OFFICE 2,598,662

CONTROL APPARATUS FOR BATTERY WIND CHARGERS

Roy N. Gurley, Leslie R. Gurley, and Cecil N. Gurley, Calgary, Alberta, Canada

Application January 10, 1950, Serial No. 137,704
In Canada July 25, 1949

4 Claims. (Cl. 290—44)

This invention relates to control apparatus for battery wind charges, having as its objects the provision of a swingable switch operationally influenced by the usual variations taking place in the specific gravity or the density of the liquid in an electric storage battery, for controlling the operation of the brake band of the conventional charger mechanism equipped with a wind propeller, and also the provision of switches to control a reversible motor so geared as to operate the connecting rod attached to the brake band.

An advantage in our invention is that the above mentioned swingable switch, mounted on one of a series of batteries, is automatically operated by the changed conditions in the battery liquid due to variations in its specific gravity or density as the battery becomes consequently exhausted or reversely is being charged from an outside source of electric energy, such variations ranging from a fully charged condition to a low danger point of discharge.

Further advantages reside in the facts that sparking at the switch is impossible since this switch is of the mercury pole-contacting type, the mercury connecting the terminals of reversible switches controlling the gear-operating motor, and disconnecting them as the switch swings, and also that the apparatus only requires attention for normal motor lubrication and replacement of worn parts.

The installation of this apparatus is an assurance that battery charging is regulated uniformly, and is maintained within specific limitations, which will result in longer life and better efficiency of the batteries, and that battery plates are protected against damage by overcharging and overdischarging currents on account of its automatic features.

The rotation of the motor operating the charger brake band through the gearing assembly mentioned is only of sufficient duration to apply and release the band, and this operation is eased by the introduction of springs between the brake rod and its operative mechanism. This brake application and release is an immediate result of the particular position of the balanced switch as influenced by the battery fluid density, in which switch the contained mercury globule travels from one end to the other and back gravitationally affected, its swinging action being directly dependent on the rise and fall of a float in the battery liquid.

This invention will be best understood from a consideration of the following detailed description taken in connection with the accompanying drawings forming part of this specification, with the understanding that the invention is not necessarily confined to any strict conformity with the showings of the drawing, but may be changed or modified constructionally, so long as such changes or modifications do not denote any material departure from the salient features of the invention as expressed in the appended claims, and do not depart from the principles of our invention.

Fig. 1 is an elevational view of the apparatus to a disproportionate scale, and as it would be mounted at the base of a wind charger tower, and semi-diagrammatically shows the single battery, the switch and the line connections.

Fig. 2 is a detailed view of the mercury controlling switch unit and float mounted on the top of a battery.

Fig. 3 is a side view of the mechanism relative to the switch.

Fig. 4 is a side view of the mechanism in part showing the upper one of the two sliding switches with motivating prime mover.

Referring to the drawings A is a typical form of structure suitable for containing the operational parts comprising this battery wind charger apparatus, although drawn somewhat out of proportion with these parts. A motor 1 drives a sprocket 2 by means of a chain 3, and in order to reduce speed considerably reduction gearing is introduced between this motor and a wind charger brake rod 4. The control of the reciprocal movements of this brake rod is the prime object of this invention.

The sprocket 2 is mounted on a spindle 5 carried on the structure frame A, and a sprocket of smaller diameter 6 is mounted on the same spindle and drives a larger sprocket 7 in tandem manner, by means of a chain 8. A spindle 9 carries the sprocket 7 and is journaled on the frame A. The sprocket 7 indirectly communicates the necessary movements to the brake rod 4. Through this gearing the speed of the motor 1 is relayed suitably to the brake rod by gradual reduction, and moves the rod reciprocally and at the proper stroke length to operate a brake band 10 in the hub of a propeller 11. A brake beam 12 of conventional type is installed on a pivotal bracket on the wind charger motor casing connecting the rod 4 with the braking apparatus.

In order to reduce any vibration or jarring effect between the rod 4 and the sprocket and chain driving gears a spring 13 is inserted therebetween, and is affixed to the bottom end of the rod with its other end affixed to a striker pin 14 on the sprocket 7. A second spring 15 connects this striker pin to a bracket member A1 of the structural frame A, which spring also helps to eliminate vibration on brake application.

With reference to the motivation control of this apparatus there are two sliding type switches 16 and 17 bracketed on to the frames A1 and A respectively. The spring 12a shown on the wind charger is conventional in order to raise the rod 4 when necessary. The switch 17 is activated slidably by means of the pin 14 striking a lever 18 pivoted on the frame A1, and the switch 16 is activated slidably by means of the same pin 14 striking a lever 19 pivoted on the frame A. The motor 1 is reversible, and it is these switches 16 and 17 that control the direction thereof, a clockwise rotation of the motor as viewed in Fig. 1 applies the brake on the wind charger, and an anti-clockwise rotation of the motor releases the brake. The wind charger generator is denoted by the letter D. The motor runs only sufficiently long to make and break the contacting members within the switches 16 and 17 in an automatic manner. Consequently no current will flow following each quick circuit break which takes place alternately in each of these switches. The propeller stops rotating automatically on the application of its brake as influenced by one of these two switches, and no charging current is wasted in the process.

Terminals 16a and 17a, on switches 16 and 17 respectively, are connected to terminals 1a and 1b respectively on the motor 1, one for rotation thereof in one direction and the other for rotation thereof in the opposite direction. These terminals 16a and 17a are each line-connected to a circuit control mercury switch B mounted on the top of a battery C. This battery is one of a series of banked batteries of the conventional storage battery type and arrangement.

One pole of battery C is connected to the common terminal 20 of the motor, and the other pole terminal to terminals 21 and 22 within and on the top of a sealed tube 23 containing a globule of mercury 23a. A second terminal 16b on the switch 16 connects with a terminal 21a adjacent to the terminal 21, and a terminal 17b connects with a terminal 22a adjacent to the terminal 22 within the switch tube 23.

The tubular switch 23 is dependently pivoted by means of a spindle 23b from the upright side of a dust proof case 24 enveloping the switch, and is swingable longitudinally about the axis of said spindle. The swinging impetus and the degree of swing of this switch tube is governed and controlled by the rising and falling contacts of a forked member 25 which is the shorter lever of an arm 25a fulcrumed at 26 on a pin mounted on a vertical partition 27 dividing the case 24 into two compartments 24a and 24b. This forked member engages a lug 28 projecting from one end of the tube 23 so that the raising of this forked member upsets the balance of the tube, and the contained mercury gravitates to the lowered end of the tube, and contact is made between terminals 22 and 22a to rotate the motor 1, through the switch 17, and in a direction for the release of the wind charger brake, and thereby start battery charging by the generator D of the charger. On the reverse swing of the forked member 25 to push the lug 28 downwardly the mercury will flow to connect the terminals 21 and 21a, energising the motor 1 reversely through the switch 16 to brake the propeller drum and stop battery charging.

The switch controlling element of this apparatus is a float 29 immersed in the battery fluid, which is suspended by a rod 30 passing slidably through the top cover of the battery and also through the bottom of the case 24, and is guided through an aperture in the cover of this case. Fingers 31 and 32 are adjustably affixed to this rod within the case which strike the long arm 25a of the tilting means for the circuit control switch B, so that this lever is raised and lowered as the float rises and lowers. As this float rises and falls synchronously with the increased and lowered specific gravity or density of the battery fluid respectively these movements govern the direction of rotation of the motor 1 through the tilting of the switch B, which switch is the selector for the circuit switches 16 and 17, for stopping and starting the wind charger propeller.

The case 24 extends over the lever 25a and the upper portion of the rod 30, and both compartments 24a and 24b are as nearly as possibly dust and fume proof. Three terminals carry the current passing from the switch B, the wires from which pass through the case 24 and are connected with the contact points within the switch by means of flexible insulated wires which wires have been designated as "a", "b", and "c." The line a connects the switch 16, the line b to one terminal of the master battery C, and the line c connects with the switch 17. A third circuit line connects the other battery terminal post with the motor as shown by line d in Fig. 1. As soon as the mercury 23a is tilted over by the movement of the rod 30 a circuit a and b or a circuit b and c is closed depending on the direction of tilt of this switch, and the motor is selectively rotated clockwise or anti-clockwise by the battery C, but only momentarily.

What we claim as our invention is:

1. In a wind-driven electric battery charging unit, the combination of a fluid filled battery to be charged, a propeller, a hub mounted on a shaft associated with said propeller, a brake-rod associated with the propeller through this hub, braking means activated by the vertical movements of said brake-rod as applied thereto by an associated source of energy for stopping the rotation of the propeller in association with and corresponding with the changes in the specific gravity of the fluid in said battery, a float in said battery buoyantly influenced by the changes in the specific gravity of the battery fluid, a reversible type motor electrically connected for the reciprocal operation of said brake-rod, a terminal on said motor so connected with the windings thereof for clockwise rotation of the motor, a terminal on said motor so connected with the windings thereof for anti-clockwise rotation of the motor, a reversing-motor switch for said motor between same and said battery, said switch being activated by the movements of said float due to its buoyancy in the battery fluid, reduction gearing between said motor and said brake-rod, a pair of reciprocal slide type twin-pole motor control switches, one pole of one of said switches being electrically connected with the motor terminal for clockwise rotation of the motor, and one pole of the other of said switches being electrically connected with the motor terminal for anti-clockwise rotation of the motor, and lever means operated by said reduction gearing for opening one of said twin-pole switches and closing the other one alternately to correspond with the alternate clockwise and anti-clockwise rotation of said motor and gearing, in order to stop said motor after the same has actuated said brake-rod via said gearing sufficiently to effect the automatic release or stoppage of said propeller.

2. The structural arrangements of a unit according to claim 1 and including further, as part of said reversing-motor switch, a tiltable mercury-tube having a pair of opposite pole terminals sealed in at each end thereof, one wire of one pair of which terminals is connected to that terminal of one of the said twin-pole motor switches opposite to a terminal thereon connected with the said motor, and the other wire of one pair of which mercury-tube terminals is connected to that terminal of the other of the said twin-pole motor switches opposite to its terminal thereon connected with the said motor, and a pair of median common pole terminals, one of which is disposed adjacent to each of the first mentioned terminals within the mercury-tube for return circuit wire connection with that terminal of the battery opposite the motor connection terminal.

3. The structural arrangements according to claim 1 including a supporting framework for the unit, and in which the said means operated by said reduction gearing for opening and closing said twin-pole switches consists further of a lever arm for each switch pivotally connected at one end to the said framework, and is connected at its other end to its selected switch to reciprocally activate the same, and a striker on one of the rotatable components of said reduction gearing interceptable with one of the other of said arms during rotation of the gearing in opposite directions as determined by the direction of rotation of the motor in conjunction with its reversing switch.

4. The structural arrangements according to claim 1 to which is added a connecting rod between the said float and said reversing-motor switch, and a lever actuated by said rod as it rises and falls to rock the said mercury-tube reversing-motor switch.

ROY N. GURLEY.
LESLIE R. GURLEY.
CECIL N. GURLEY.

REFERENCES CITED

The following references are of record in the file of this patent:

UNITED STATES PATENTS

| Number | Name | Date |
|---|---|---|
| 1,125,783 | Waters | Jan. 19, 1915 |
| 1,165,418 | Kerr | Dec. 28, 1915 |
| 1,415,385 | Oswald | May 9, 1922 |
| 1,609,883 | Potts | Dec. 7, 1926 |
| 1,816,632 | Bucklen | July 28, 1931 |
| 1,941,611 | Manikowske | Jan. 2, 1934 |
| 2,104,632 | Agnew | Jan. 4, 1938 |
| 2,159,886 | Cullin | May 23, 1939 |
| 2,179,885 | Fumagalli | Nov. 14, 1939 |
| 2,199,234 | Arndt | Apr. 30, 1940 |